United States Patent [19]

Yamamori et al.

[11] Patent Number: 4,910,234
[45] Date of Patent: Mar. 20, 1990

[54] DISINTEGRATION TYPE RESIN PARTICLES, ITS PREPARATION AND COATING COMPOSITION CONTAINING THE SAME

[75] Inventors: Naoki Yamamori, Kazunori Kanda, both of Osaka, Japan

[73] Assignee: Nippon Paint Co., Ltd., Osaka, Japan

[21] Appl. No.: 167,840

[22] Filed: Mar. 14, 1988

[30] Foreign Application Priority Data

Mar. 12, 1987 [JP] Japan ................................. 62-57565
Mar. 12, 1987 [JP] Japan ................................. 62-57566

[51] Int. Cl.$^4$ .............................................. C09D 5/14
[52] U.S. Cl. ................................. 523/122; 428/402; 424/81; 526/203; 526/240; 526/241
[58] Field of Search ............ 428/402; 106/15.05, 106/18.03; 525/123, 170, 116, 185; 523/122; 424/81

[56] References Cited

U.S. PATENT DOCUMENTS 4,531,975  7/1985  Salome ................................. 524/404

Primary Examiner—Allan M. Lieberman
Attorney, Agent, or Firm—Wenderoth, Lind & Ponack

[57] ABSTRACT

Disintegration type resin particles having an average grain diameter of 0.01 to 250μ and being composed of a crosslinked resin having at least one crosslinking structure carried metal ester bond of the formula:

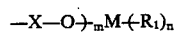

wherein X represents

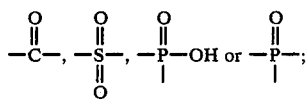

$R_1$ is a monovalent, bioactive organic acid residue; M stands for a polyvalent metal having a valence of 3 or more; m is an integer of 2 or more; n is an integer of 1 or more, providing that the sum of m and n is equal to the valence of said metal M, and a coating composition containing said resin particles are provided. The coating obtained is characterized in that it is gradually hydrolyzed in an ionic atmosphere as in sea water and dissolved out, liberating a bioactive organic acid as well as metal ions.

6 Claims, No Drawings

DISINTEGRATION TYPE RESIN PARTICLES, ITS PREPARATION AND COATING COMPOSITION CONTAINING THE SAME

FIELD OF INVENTION

The present invention relates to disintegration type resin particles, their preparation and a coating composition containing the same. More specifically, the invention concerns in a spherical form particles composed of a crosslinked resin which can be thoroughly disintegrated from the exterior and interior of the respective particle in an ionic atmosphere, liberating a bioactive organic acid as well as metal ions and are useful as a resinous filler for various compositions and especially for an antifouling paint. The invention also concerns preparation of said resin particles and a coating composition containing the same.

BACKGROUND OF THE INVENTION

Recently, in an antifouling paint and other areas, public attention was directed to the use of resinous filler particles which can be hydrolyzed in an ionic atmosphere, as in sea water of a weak alkaline condition, and gradually decomposed and dissolved out. These characteristics are specifically beneficial for prolonging the antifouling and polishing effects of an antifouling paint and attaining energy saving in sailing and the like.

Various resins have been proposed for this end as, for example, acrylic resins with halogenated aliphatic acid bondings or electron attractive group-containing acyl bondings (e.g. Japanese Patent Appln. Nos. 101,463/81 and 198,240/81); acrylic resins containing organic tin salts (e.g. Japanese Patent Appln. Kokai No. 98570/82); and polyester resins having metal ester bondings in the polymer main chain (e.g. Japanese Patent Appln. Nos. 165,921/81 and 165,922/81) and the like.

However, they were merely developed as resinous vehicles for antifouling paints, requiring film-forming properties and optimum film performance and therefore, there were in fact various limitations on the employable resins in respect to the molecular weight range, metal content and the like, in addition to the hydrolysis nature thereof.

In a coating composition area, attempts have also been made to add, to a film-forming resinous varnish, resin powders for improving the application characteristics, without unduly increasing viscosity, of the coating composition.

Therefore, even in an antifouling paint, hydrolysis type resin powders having no film-forming properties have been actually examined. For example, in Japanese Patent Publication No. 3830/86, there are disclosed film-forming polymer compositions comprising a polyacrylic acid salt having the constituting unit of the formula:

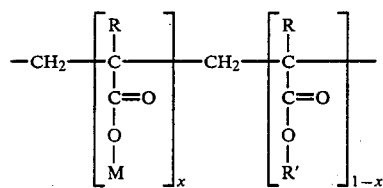

in which M stands for Cu or Zn.

It is stated that said polyacrylic acid salts may be of a film-forming type or of a non-film-forming type and the molecular weight is in a range of 5000 to $1 \times 10^6$. Therefore, it is clear that hydrolysis type crosslinked resins having no film-forming properties are likewise suggested in this publication. However, in preparing said resins, a specific method is used, wherein a carboxyl bearing acrylic resin is first neutralized with caustic soda and dissolved in an aqueous medium and thus obtained polymer solution is reacted with a metal salt, thereby forming a precipitate of an insoluble polyacrylic acid salt. In this type of reaction, a soluble resin is gradually changed to an insoluble type with the progress of the ion-exchange reaction, and the formed insoluble resins are precipitated as amorphous masses each varying in size and shape. Since a smaller precipitate has a larger surface area and more rapidly hydrolyzed with sea water than a larger one, when the aforesaid precipitates are used in a self-polishing type antifouling paint, smaller precipitates are quickly hydrolyzed and consumed and larger precipitates are wastefully let out of the coating with the dissolved resin. Therefore, indeed an effective antifouling can be expected with the composition in an early stage, but a long-lasting effect cannot be obtained therewith.

Furthermore, in the method of said Japanese Patent Publication No. 3830/86, an acrylic resin and a metal salt are reacted with each other, each in solution form in water, and loss in solubility of the resin is the only cause of said precipitation. Since the reaction makes steady progress at the surface area of the precipitated resin interacted with said aqueous metal salt solution, the metal ester bondings are always present in a higher concentration at the surface layers of the precipitates. Moreover, the precipitated resins do necessarily have a number of acid groups together with metal ester bondings, because precipitation is occured in an aqueous medium from the decrease in solubility of the resin. They are, therefore, too hygroscopic to use as the resinous filler in a polishing type antifouling paint. For these reasons, a long-lasting antifouling effect cannot be expected with the coating composition added with the disclosed precipitates.

Since the precipitates are not of spherical form, it is hardly possible to maintain the same in a stabilized state of dispersion in a coating composition.

Under such circumstances, the present inventors, having exerted efforts to obtain a novel, spherical form of resin particles which can be added as a resinous filler in a coating composition, thoroughly disintegrated from the interior and exterior of the respective resin particle and which are specifically useful for the preparation of a long-lasting, polishing type antifouling paint, have succeeded in obtaining novel disintegration type crosslinked acrylic resin particles having an average grain diameter of 0.01 to 250 μ and containing metal ester bond bearing crosslinks uniformly distributed within the particle bodies. This is achieved by a method wherein a monomer mixture of (A) 5 to 98% by weight of metal ester bond bearing multifunctional polymerizable monomer represented by the formula:

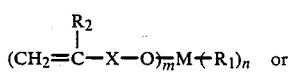

-continued

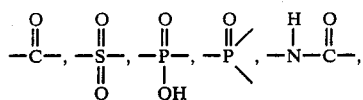

(in which $R_2$ represents hydrogen or methyl group; X is

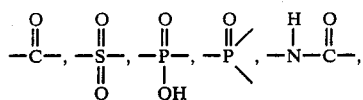

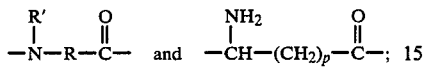

$R'$ is hydrogen, methyl or ethyl group; R is hydrocarbon residue having 1 to 20 carbon atoms; p is 0 or 1 to 5; $R_1$ is hydrocarbon residue having 1 to 10 carbon atoms; M is a metal whose valency is 2 or more; Y is an organic residue; m and n are positive integers satisfying the conditions: $2 \leq m \leq q$, $n = q - m$ wherein q is equal to the metal valency) and 95 to 2% by weight of mono- or multi-functional polymerizable monomer other than said (A) having at least one $\alpha,\beta$-ethylenically unsaturation bond, in a reaction medium which is unable to dissolve the formed polymer, and applied for patent on it (Japanese Patent Application No. 200,344/86, now laid open as Kokai No. 56510-88/1988).

However, when hydrolyzed, said resin particles can liberate only metal ions, and therefore, if an antifouling paint is designed with these particles alone, the metal source must be necessarily limited to toxic members and the metallic content in the resin must be increased in a moderately higher order. For these reasons, a further development has been desired.

It is, therefore, an object of the invention to provide a novel, disintegration type, spherical form of crosslinked resin particles which can be stably added and dispersed as resinous filler in a resinous varnish for a coating composition, and gradually disintegrated from the exterior and interior of the respective particle in an ionic atmosphere, capable of liberating a bioactive organic acid as well as metal ions. An additional object of the invention is to establish an industrially advantageous method for the preparation of said resin particles. A further object is to provide a novel coating composition containing, as resinous filler, such disintegration type resin particles, which is excellent in film-forming properties, and capable of resulting a coating which is excellent in respect to the self-polishing effects because of the disintegration of said resin particles by hydrolysis in an ionic atmosphere and also in respect to antifouling effects because of the gradual liberation of toxic, bioactive substance besides metal ions. Further objects of the invention shall be clear from the description in the specification and the appended claims.

SUMMARY OF THE INVENTION

According to the invention, the aforesaid objects can be attained with the present disintegration type resin particles having an average grain diameter of 0.01 to 250 μ and being composed of a crosslinked resin having at least one crosslinking structure carrying a metal ester bond of the formula:

 (I)

wherein X represents

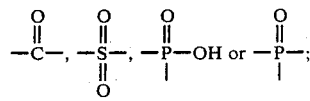

$R_1$ is a monovalent, bioactive organic acid residue; M stands for a polyvalent metal having a valence of 3 or more; m is an integer of 2 or more; n is an integer of 1 or more, providing that the sum of m and n is equal to the valence of said metal M, and a coating composition containing, as a resinous filler, said disintegration type resin particles.

The present disintegration type resin particles are novel in that the metal ester bond is included in at least one crosslinking structure of the crosslinked resin and a bioactive organic acid residue is bonded to the metal of said metal ester bond. Such resin particles can be advantageously prepared by either one of the following methods. That is, in one method, a monomer mixture of 5 to 100% by weight of metal ester type multifunctional polymerizable monomer represented by either one of the following:

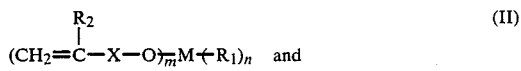 (II)

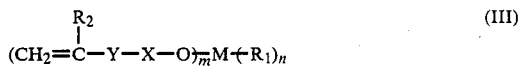 (III)

wherein X is

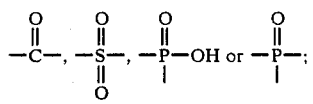

$R_2$ is hydrogen or methyl group; $R_1$ is a monovalent, bioactive organic acid residue; M stands for a polyvalent metal having a valence of 3 or more; m is an integer of 2 or more; n is an integer of 1 or more, providing that the sum of m and n is equal to the valence of said metal M, and 95 to 0% by weight of another $\alpha,\beta$-ethylenically unsaturated mono- and/or multifunctional polymerizable monomer, is polymerized in a solvent which cannot dissolve the formed polymer and the solvent is then removed off from the reaction mixture.

In another method, a mixture of a resin having an acid group of the formula: —X—OH or alkali metal salt thereof, in which X is

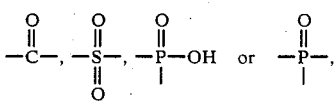

an organic acid of the formula:

in which $R_1$ is a monovalent, bioactive organic acid residue, and a metal compound selected from the group consisting of hydroxides, halogenides, sulfides and oxides of polyvalent metal having a valence of a 3 or more, are reacted at a temperature lower than the decomposition point of said metal compound, and the formed product is then pulverized and sieved.

DESCRIPTION OF THE PREFERRED EMBODIMENTS

The metal ester type multifunctional polymerizable monomers of the formulae (II) and (III) as used in the preparation of the present disintegration type resin particles are characterized by having at least 2 $\alpha,\beta$-ethylenically unsaturated bonds, a polyvalent metal and a bioactive organic acid residue, said unsaturated bonds and bioactive organic acid residue each being connected with said polyvalent metal via an ester bonding. The said compounds are crosslinking monomers and are used each singularly or in combination of two or more.

The aforesaid monomers may be easily and advantageously prepared by reacting, under stirring, (a) a polymerizable unsaturated organic acid represented by the formula:

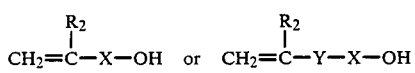

(wherein $R_2$, X and Y each have the same meaning as defined above), or an alkali metal salt thereof, (b) a metal compound selected from the group consisting of hydroxides, halogenides, sulfides and oxides of polyvalent metals having a valence of 3 or more, and (c) a monovalent bioactive organic acid, preferably in a solvent, at an elevated temperature which is lower than the decomposition temperature of said metal compound.

Examples of said polymerizable unsaturated organic acids are methacrylic acid, acrylic acid, p-styrene sulfonic acid, 2-methyl-2-acrylamide propane sulfonic acid, 3-acid phosphoxy propyl methacrylate, 3-chloro-2-acid phosphoxy propyl methacrylate, 2-acid phosphoxy ethyl methacrylate, itaconic acid, itaconic anhydride, maleic acid, maleic anhydride, monoalkyl itaconate (e.g. methyl-, ethyl-, butyl-,2-ethylhexyl-itanconates and the like), monoalkyl maleate (e.g. methyl-, ethyl-, butyl-, 2-ethylhexyl-maleates and the like), half-esters of acid anhydrides with hydroxyl containing polymerizable unsaturated monomers, for example, half-ester of acid anhydride as succinic anhydride, maleic anhydride, phthalic anhydride and the like, with 2-hydroxyethyl (meth) acrylate and the like. These organic acids are used each singularly or in the combination form of two or more.

As to the metal component, any of the metals whose valences are 3 or more may be satisfactorily used.

Such metals include the members that belong to the groups, IIIa (e.g. Al, Ga, Tl), IVb (e.g. Ti, Zr), IVa (e.g. Si, Ge, Sn, Pb), Vb (e.g. V), VIb (e.g. Cr, Mo) and Fe of the Periodic Table.

One or more than two of these metals may be satisfactorily used in the form of hydroxide, halogenide and especially chloride, sulfide (including a sulfate and a nitrate) or oxide. As the monovalent bioacitve organic acid, any of the aliphatic, aromatic, alicyclic or heterocyclic acids known to be useful as medicines, agricultural chemicals, repellents, bactericides, anti-bacterial agent, fungicides, antibiotics, perfumes, antiseptics and the like, are satisfactorily used.

Examples of such materials are as follows:

(1)

containing acid: alicyclic carboxylic acids as chaulmooogric acid, hydnocarpusic acid and the like; aromatic carboxylic acids as salicyclic acid, cresotic acid, naphthoic acid, p-oxybenzoic acid, benzoic acid, mandelic acid, dibromosalicyclic acid, cinnamic acid, capro chlorone, nitrobenzoic acid, 2,4-dichloro-phenoxy acetic acid, 2,4,5-trichloro-phenoxy acetic acid, nitronaphthalene carboxylic acid, aspirin, nicotinic acid and the like; lactone series carboxylic acids as pulvinic acid, and the like; uracil derivatives as uracil-4-carboxylic acid, 5-fluorouracil-4-carboxylic acid, uracil-5-carboxylic acid and the like; carboxylic acids with penicillin sturucture as penicillin U, Ampicillin, penicillin BT, penicillanic acid, penicillin G, penicillin O and the like; sarcomycin, chloramphenicol, variotin, Rifamycin B, Lusonsomycin and the like.

An alcoholic hydroxyl containing, bioacitive substance may be treated with an acid anhydride (e.g. succinic anhydride, maleic anhydride, phthalic anhydride, tetrahydro phthalic anhydride) to give a half-ester product, which may be used as

containing acid. Examples of such alcoholic hydroxyl containing, bioactive substances are testosterone, uridine, thymidine, L-menthol, cinnamic alcohol, benzyl alcohol, maltol, linalool, dimethyl benzyl carbinol, rhodinol and the like.

(2)

containing acid: dithiocarbamates such as dimethyl dithiocarbamate and the like.

(3)

containing acid: Sulfur containing aromatic compounds as 1-naphthol-4-sulfonic acid, p-phenyl benzene sulfonic acid, $\beta$-naphthalene sulfonic acid, quinoline sulfonic acid and the like.

(4)

containing acid: Triethyl-pyrophosphate, dimethylaminophosphate, and other organo-phosphoric compounds.

(5) —S— containing acid: Compounds having

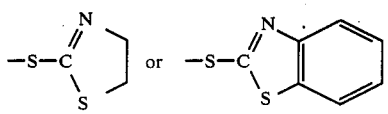

group.

(6)

contianing acid: Thiocarboxylic acids.

(7) —O— containing acid: Phenols as phenol, cresol, xylenol, thymol, carvacrol, eugenol, phenyl phenol, benzyl phenol, guaiacol, pterostilbene, (di) nitrophenol, nitrocresol, methyl salicylate, benzyl salicylate, (mono-, di-, tri-, tetra- or penta-) chlorophenol, chlorocresol, chloroxylenol, chlorothymol, p-chloro-O-cyclohexyl phenol, p-chloro-O-cyclopentyl phenol, p-chloro-O-n-hexyl phenol, p-chloro-O-benzyl phenol, p-chloro-O-benzyl-m-cresol and the like; and β-naphthol, 8-hydroxy quinoline and the like.

These are typical examples of the employable organic acids and the invention can never be limited to the exemplified members only. In the present invention, any of the organic acids may be satisfactorily used, providing they exhibit a biological activity, for example, in a conventional antibacterial activity test (e.g. paper-disc method).

In this invention, the abovesaid metal ester type multifunctional polymerizable monomers of the formula (II) or (III) are used in an amount corresponding to 5 to 100% by weight of the total monomers.

This is because if the abovesaid multifunctional monomers are less than 5% by weight of the total monomers used, the produced resin is dissolved in a polar solvent and hence cannot be maintained in the form of resinous particles in that solvent.

The other monomers are used in an amount of 95 to 0% by weight with the abovesaid metal ester type multifunctional monomers are monofunctional or multifunctional α,β-ethylenically unsaturated monomers, which may be classified as follows:

(1) carboxyl containing monomers, as, for example, acrylic acid, methacrylic acid, crotonic acid, itaconic acid, maleic acid, fumaric acid and the like, (2) hydroxyl containing monomers, as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, (3) nitrogen containing alkyl (meth) acrylates, as, for example, dimethyl aminoethyl acrylate, dimethyl aminoethyl methacrylate and the like, (4) polymerizable amides, as, for example, acrylamide, methacrylamide and the like, (5) polymerizable nitriles, as, for example, acrylonitrile, methacrylonitrile and the like, (6) alkyl acrylates and alkyl methacrylates, as, for example, methyl acrylate, methyl methacrylate, ethyl acrylate, ethyl methacrylate, n-butyl acrylate, n-butyl methacrylate, 2-ethyl hexyl acrylate and the like, (7) polymerizable aromatic compounds, as, for example, styrene, α-methyl styrene, vinyl toluene, t-butyl styrene and the like, (8) α-olefins, as, for example, ethylene, propylene and the like, (9) vinyl compounds, as, for example, vinyl acetate, vinyl propionate and the like,

(10) diene compounds, as, for example, butadiene, isoprene and the like,

(11) metal containing monofunctional compounds, as, for example, vinyl ferrocene, trialkyl tin (meth) acrylate, γ-methacryloyl-oxy-trimethoxy silane and the like.

Multifunctional polymerizable monomer other than said metal ester type polymerizable monomer may likewise be used, providing they have 2 or more radically polymerizable, ethylenic bonds per molecule.

Examples of such monomers are polymerizable unsaturated monocarboxylic acid esters of polyhydric alcohols, polymerizable unsaturated alcohol esters of polycarboxylic acids, and aromatic compounds substituted with 2 or more vinyl groups and the like, including ethylene glycol diacrylate, ethylene glycol dimethacrylate, triethylene glycol dimethacrylate, tetraethylene glycol dimethacrylate, 1,3-butylene glycol dimethacrylate, trimethylol propane triacrylate, trimethylol propane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxy methyl ethane diacrylate, 1,1,1-trishydroxy methyl ethane triacrylate, 1,1,1-trishydroxy methyl ethane dimethacrylate, 1,1,1-trishydroxy methyl ethane trimethacrylate, 1,1,1-trishydroxy methyl propane diacrylate, 1,1,1-trishydroxy methyl propane triacrylate, 1,1,1-trishydroxy methyl propane dimethacrylate, 1,1,1-trishydroxy methyl propane trimethacrylate, triallyl cyanurate, triallyl isocyanurate, triallyl trimellitate, diallyl terephthalate, diallyl phthalate, divinyl benzene and the like.

The monomer mixture of 5 to 100% by weight of at least one of the aforesaid metal ester type multifunctional polymerizable monomers and 95 to 0% by weight of at least one of the abovesaid mono- or multifunctional polymerizable monomers is polymerized according to a conventional polymerization technique, in a reaction medium which cannot dissolve the formed polymer to give the present disintegration type crosslinked resin particles having an average grain diameter of 0.01 to 250 μ. As the polymerization technique, any of the conventional emulsion polymerization, NAD polymerization, suspension polymerization, precipitation polymerization means may be satisfactorily used. The polymerization initiators used are also of a conventional type. Typical examples are organic peroxides as benzoyl peroxide, t-butyl peroxide, cumene hydroperoxide and the like; organic azo compounds as azobiscyanovaleric acid, azobisisobutyronitrile, azobis(2,4-dimethyl) valeronitrile, azobis(2-amidinopropane) hydrochloride and the like; inorganic water soluble radical initiators such as potassium persulfate, ammonium persulfate, hydrogen peroxide and the like; and redox type initiators comprising the abovesaid inorganic water soluble radical initiator and sodium pyrosulfite, sodium bisulfite or bivalent iron ions.

If desired, an appropriate amount of a conventional chain transfer agent as, for example, lauryl mercaptan, hexyl mercaptan and the like may be used therewith.

In obtaining the present resin particles having relatively fine average grain diameter, e.g. 0.01 to 40 μ, it is highly recommended to adopt an emulsion polymerization means wherein a monomer mixture is polymerized in water or aqueous medium containing water miscible organic solvent in the presence of an emulsifier.

Water is then removed off from thus obtained emulsion by, for example, spray drying, solvent substitution, azeotropic distillation, filtration and drying, to obtain the resin particles.

As the emulsifier, any of the members customarily used for that purpose may be satisfactorily used, including surfactants and resin oligomers. However, particularily useful members are amphoionic group-containing, water-soluble resin oligomers as disclosed in Japanese Patent Application Kokai No. 129,066/83 and U.S. Pat. No. 4,461,870, amphoionic group-containing alkyd resin oligomers disclosed in U.S. Pat. No. 4,322,324, amphoteric amino sulfonate derivative of epoxy resins disclosed in U.S. Pat. No. 4,379,872. More specifically, acrylic, alkyd, polyester, modified epoxy, melamine and polyether resin oligomers having the amphoionic group of the formula:

wherein R is a member selected from optionally substituted alkylene having 1 to 6 carbon atoms and phenylene and Y is —COOH or —SO$_3$H, may be advantageously used.

By the adoption of such resin oligomer, a highly stabilized dispersion can be obtained, either in an aqueous or organic reaction medium.

Therefore, the thus prepared resin particles may be stably stored without the fear of blocking for a longer duration of time and may be stably dispersed in another resin varnish in the preparation of a coating composition.

The present resinous particles may also be prepared by polymerizing a mixture of the defined monomers in an organic solvent which can dissolve the monomers used but not the produced polymer as, for example, hexane, heptane, octane and other aliphatic hydrocarbons (by the so-called NAD polymerization method), or by adopting a conventional suspension polymerization or precipitation polymerization means. Pulverization and screening may be used for the control of the average grain diameter of the present resin particles.

In either method, the aforesaid metal ester type multifunctional polymerizable monomers and other copolymerizable monomers are copolymerized in a reaction medium which cannot dissolve the formed polymer, and therefore, the thus obtained crosslinked resin particles of the invention are characterized in that they each have a distinct interface, and the metal ester bondings represented by the formula:

are necessarily included in the crosslinking portions of the resin molecule.

Thus, a number of the aforesaid metal ester bondings are uniformly distributed within the whole body of the resin particle, and a quantity of a bioactive organic acid is likewise included in the resin particles in hydrolyzable form: $\text{—}(\text{M}\text{—}(\text{R}_1)_n)$.

Since the metal ester bonding is easily hydrolyzed under ionic atmosphere, the present resin particles are disintegrated under certain conditions by hydrolysis, and hence, they may be called, in that sense, as disintegration type or collapsible resin particles, in contrast to the heretofore proposed hydrolyzable resin particles.

At that time, said bioactive organic acid can also be released out, as well as metal ions.

Usually, the present resin particles have a crosslink density of said metal ester bond bearing crosslinks, expressed in terms of (number of moles of organic acid involved in the metal ester bond bearing crosslinks)/(gram of resin particles) of 0.00003 to 0.01 mol/g.

At the level of less than 0.00003 mol/g, no adequate and effective disintegration of the resin particles can be obtained, whereas at the level of more than 0.01 mol/g, considerable difficulties are encountered in the preparation of the resin particles.

In a most preferable embodiment of the invention, the said resin particles are prepared, each in spherical form, so that the crosslink density of the metal ester bond bearing crosslinks in the center portion is much higher than those of the surface layers.

Such resin particles may be advantageously prepared by polymerizing the aforesaid monomer mixture in an appropriate reaction medium which cannot dissolve the metal ester type multifunctional polymerizable monomer as well as the formed polymer.

By the selection of other soluble monomers, the metal ester bonds are concentrated in the center portion of the particle body and the surface layers are mainly composed of said soluble monomers.

Solubility differences of the metal ester type multifunctional monomer and other polymerizable monomer in a defined reaction medium may also be utilized for the same purpose. By the selection of a particular polymerizable monomer whose solubility in the reaction medium is much higher than the solubility of a metal ester type multifunctional monomer, the metal ester crosslink density inclines toward the center portion of the respective resin particle.

In another method, the monomer addition sequence or monomer ratio may be altered in the course of the polymerization. For example, a monomer mixture with a comparatively larger quantity of metal ester type multifunctional monomer or only metal ester type multifunctional monomer may be added to the reaction system in an early stage of polymerization and a monomer mixture with a lesser quantity of said multifunctional monomer in the later stage of the polymerization, thereby forming a double structured particle with a metal ester rich core portion and a metal ester poor shell portion. The location and amount of metal ester bonds in the present resin particles can be easily determined by a simple analysis means. The present disintegration type resin particles may also be prepared by an alternative method wherein a mixture of a resin having an acid group of the formula: —X—OH or alkali metal salt thereof, in which X is

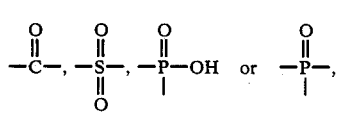

an organic acid of the formula: R$_1$—COOH in which R$_1$ is a monovalent bioactive organic acid residue, and a metal compound selected from the group consisting of hydroxides, halogenides, sulfides and oxides of a polyvalent metal having a valence of 3 or more, is reacted at a temperature lower than the decomposition point of said metal compound, and the formed product is pulverized and sieved. In this method, as the acid group bearing resin, any of the conventional coating use resins including an acrylic resin, polyester resin, alkyd resin, polyether resin, epoxy resin and the like may be satisfactorily used, providing they have the desired acid groups therein.

They may be used each singularily or in combination form and in the free acid or alkali metal salt form.

As to the monovalent bioactive organic acid and metal component, reference should be made to the former statement regarding the metal ester type multifunctional polymerizable monomers (II) and (III).

In this alternative method, the selected materials are mixed and heated at an elevated temperature to give the desired product. However, when a low boiling monovalent bioactive organic acid is selected and the involved reaction is accompanied with a dehydration, there is a risk that an amount of said monovalent organic acid is distilled out of the system with the formed water and the undesired metal ester bondings are formed between the resin molecules. Therefore, in such circumstances, it is preferred to use a larger quantities of said monovalent organic acid and to prevent an undesired increase in the viscosity or gelation of the reaction mixture. The formed product is then pulverized and sieved in a conventional way.

Irrespective of the type of method used, the present disintegration type resin particles have an average grain diameter of 0.01 to 250 $\mu$ and are composed of a crosslinked resin having at least one crosslinking structure carried with metal ester bond of the formula:

$$-X-O)_{\overline{m}}M-(R_1)_n \qquad (I)$$

wherein X, M, R, m and n are as defined above can be successfully and advantageously prepared.

Since the present crosslinked resin particles are used as a resinous filler in an antifouling paint or other coating composition, the average grain diameter is limited to a range of 0.01 to 250 $\mu$, preferably from 0.01 to 70 $\mu$ and most preferably from 0.02 to 20 $\mu$. This is because, if the grain diameter is less than 0.01 $\mu$, there are difficulties in actual handling of the resin particles due to dust problems and the like, and long-lasting antifouling effects cannot be attained with these particles because of their excessively higher decomposition speed in hydrolysis due to a large specific surface area. On the other hand, if the average grain diameter is more than 250 $\mu$, there are problems such that only rough surface can be resulted with the coating composition and no effective disintegration of the resin particles can be expected therewith.

Though the present disintegration type resin particles may be useful as a resinous filler in various products including coating composition, plastic molding, agricultural products and the like, the most important application is an antifouling paint. In fact, in the third aspect of the invention, there is provided a coating composition containing the present disintegration type resin particles uniformly distributed in a film-forming resin varnish, which is specifically useful as a self-polishing type antifouling paint.

In that application, the solid weight ratio of said film-forming resin to said particle resins may be selected in general in a range of 99/1 to 30/70. This is because if the abovesaid ratio is over 99/1, the desired polishing effect is hardly obtained, whereas if it is less than 30/70, there is a bad influence on the film-forming property of the composition.

As the film-forming resin varnish, any of the members customarily used in a coating composition may be satisfactorily used. Examples are varnishes of an alkyd resin, polyester resin, acryl resin, epoxy resin, phenol resin, chlorinated rubber, vinyl chloride resin, vinyl acetate resin, urethane resin, amino resin, silicone resin, and various modified resins as epoxy modified, metal modified, urethane modified or amino modified alkyd, polyester, acryl or silicone resin. If desired, various known additives as pigments, surface conditioners, solvents, antifouling agents and the like may be added to the present coating composition.

In these applications, the aforesaid amphoionic group containing resin oligomers mentioned in connection with the preparation of the present resin particles may be successfully and advantageously used for aiding the dispersion stability of the resin particles in a resin varnish.

Thus, in a preferred embodiment, the present resin particles are mixed with such resin oligomers and dispersed in a resin varnish. There are no particular problems in the preparation and application of the coating composition of this invention.

The coating obtained with the present coating composition can be gradually hydrolyzed in an ionic atmosphere and disintegrated materials are fallen off from the coating by chalking phenomenon. At the same time, a strong bioactive organic acid and metal ions are liberated from the coating. The hydrolysis rate is easily controlled by the selection of the metal component, base resin and amount of metal ester bonds in the disintegration type resin particles and the desired antifouling effects can be thoroughly or mainly relied on in the bioactive organic acid and, if desired, metal ions carried on said particles. Therefore, in both respect to the economy and environmental pollution, a very attractive antifouling paint can be formulated with the present disintegration type resin particles because the hydrolysis rate and effective life of the coating are controlled at will and the amounts of metal content and optional external antifouling agent can be decreased or minimized as desired.

The invention shall be now more fully explained in the following Examples. Unless otherwise stated, all parts and % are by weight.

PREPARATION OF DISINTEGRATION TYPE RESIN PARTICLES CARRIED WITH AN ANTIFOULING AGENT

Example 1

Into a four-necked flask fitted with a reflux condenser, a stirrer and a nitrogen gas inlet tube, were placed 800 parts of isopropyl alcohol, 26 parts of aluminium hydroxide, 43 parts of methacrylic acid and 111 parts of 2,4-dichlorophenoxy acetic acid and the mixture was reacted at 50° C. to obtain a solution of metal containing monomer. To this, was then added 3 parts of azobisisobutyronitrile and the mixture was reacted at 75° C. for 4 hours. With the progress of said reaction, the formed polymer was precipitated out in particle form. The precipitation was filtered, washed with deionized water and then with acetone and dried. Thus obtained resin particles (P-1) had an average grain diameter of 2.4μ.

Example 2

Into a simlar reaction vessel as used in Example 1, were placed 800 parts of isopropyl alcohol, 65 parts of tin tetrachloride, 43 parts of methacrylic acid, 44 parts of 2,4-dichlorophenoxy acetic acid and 94 parts of oleic acid and the mixture was reacted at 50° C. to obtain a solution of metal containing monomer. To this, 3 parts of azobisisobutyronitrile were added and the combined mixture was reacted at 80° C. for 4 hours. With the progress of polymerization, the formed polymer was precipitated out in particle form. The precipitation was filtered, washed and dried as in Example 1, to obtain resin particles (P-2) having an average grain diameter of 4.5μ.

Example 3

Into a similar reaction vessel as used in Example 1, were placed 1000 parts of isopropyl alcohol, 89 parts of chromic chloride, 45 parts of sorbic acid and 63 parts of methalic acid phosphoxy propyl and the mixture was reacted at 50° C. to obtain a solution of metal containing monomer. To this, were added 5 parts of 2-hydroxyethyl acrylate, 10 parts of methyl methacrylate and 3 parts of azobisisobutyronitrile and the combined mixture was reacted at 80° C. for 4 hours. The reaction mixture was then treated as in Example 1 to obtain resin particles (P-3) having an average grain diameter of 2.2μ.

Example 4

Into a similar reaction vessel as used in Example 1, were placed 800 parts of isopropyl alcohol, 54 parts of anhydrous ferric chloride, 72 parts of 2-methyl-2-acrylamide propane sulfonic acid, 44 parts of 2,4-dichlorophenoxy acetic acid and 45 parts of sorbic acid and the mixture was reacted at 50° C. to obtain a solution of metal containing monomer. To this, was added 3 parts of azobisisobutyronitrile and the combined mixture was subjected to polymerization at 80° C. for 4 hours. Thereafter, the reaction mixture was treated in the same way as stated in Example 1, to obtain resin particles (P-4) having an average grain diameter of 1.8μ.

Example 5

Into a similar reaction vessel as used in Example 1, were placed 1000 parts of isopropyl alcohol, 26 parts of aluminium hydroxide, 25 parts of nicotinic acid and 61 parts of methacrylic acid and the mixture was reacted at 50° C. to obtain a solution of a metal containing monomer. To this, were added 30 parts of methyl methacrylate and 3 parts of azobisisobutyronitrile and the combined mixture was subjected to polymerization at 80° C. for 4 hours. The reaction mixture was then treated as in Example 1, to obtain resin particles (P-5) having an average grain diameter of 1.1μ.

Example 6

Into a similar reaction vessel as used in Example 1, were placed 800 parts of isopropyl alcohol, 71 parts of tetraisopropoxy titanate, 110 parts of 2,4-dichlorophenoxy acetic acid and 43 parts of methacrylic acid and the mixture was reacted at 50° C. to obtain a solution of metal containing monomer. To this, were added 3 parts of azobisisobutyronitrile and the combined mixture was subjected to polymerization at 80° C. for 4 hours. The reaction mixture was then treated in the same way as stated in Example 1 to obtain resin particles (P-6) having an average grain diameter of 1.6μ.

Example 7

Into a similar reaction vessel as used in Example 1, were placed 1000 parts of isopropyl alcohol, 85 parts of tetra-n-butyloxy titanate, 90 parts of 2,4-dichlorophenoxy acetic acid and 60 parts of methacrylic acid and the mixture was reacted at 50° C. to obtain a solution of metal containing monomer. To this, were added 5 parts of styrene, 10 parts of ethyl acrylate, 15 parts of n-butyl methacrylate and 3.5 parts of azobisisobutyronitrile and the combined mixture was then subjected to polymerization at 75° C. for 5 hours. The reaction mixture was then treated in the same way as in Example 1, to obtain resin particles (P-7) having an average grain diameter of 1.1μ.

Example 8

(1) Preparation of emulsifier having amphoionic groups:

Into a 2 liters flask fitted with a stirrer, a nitrogen gas inlet tube, a thermoregulator, a condenser and a decanter, were placed 134 parts of bishydroxy ethyl taurine, 130 parts of neopentyl glycol, 236 parts of azelaic acid, 186 parts of phthalic anhydride and 27 parts of xylene and the mixture was heated while removing the formed water azeotropically. The temperature was raised to 190° C. in about 2 hours from the commencement of reflux, both stirring and dehydration were continued until the acid value (equivalent to carboxylic acid) reached 145, and the mixture was then allowed to cool to 140° C. While maintaining the temperature at 140° C., 314 parts of glycidyl versatate (Cardura E-10, trademark of Shell Co.) were dropwise added in 30 minutes and the combined mixture was further stirred for 2 hours and the reaction was over. The thus obtained polyester resin had an acid value of 59, a hydroxyl value of 90 and a number average molecular weight of 1054, which was hereinafter referred to as emulsifier A.

(2) Preparation of metal containing monomer:

Into a similar reaction vessel as used in Example 1, were placed 200 parts of isopropyl alcohol, 72 parts of tetraisopropoxy titanate, 87 parts of trimethyl pyrophosphate and 42 parts of methacrylic acid and the mixture was reacted at 50° C. Thereafter, the solvent was removed off under reduced pressure to obtain metal containing monomer A.

(3) Preparation of resin particles

Into a 2 liters reactor fitted with a stirrer, a nitrogen gas inlet tube and a thermoregulator, were placed 380 parts of deionized water, 50 parts of the emulsifer A and 5 parts of dimethyl ethanol amine and the mixture was heated, under stirring, to 80° C. to get a solution. To this, were dropwise and simultaneously added with a solution of 2.5 parts of azobiscyanovaleric acid in 50 parts of deionized water and 1.6 parts of dimethyl ethanol amine, a mixed solution of 100 parts of methyl methacrylate and 35 parts of ethyl acrylate and a solution of 65 parts of the metal containing monomer A in 250 parts of deionized water in 90 minutes and thereafter, the combined mixture was further stirred for 90 minutes to obtain an aqueous dispersion of acrylic resin particles having an average primary grain diameter of 52 mμ.

This dispersion was then subjected to a freeze drying to obtain the acrylic resin particles (P-8).

Example 9

Into a 1 liter reactor fitted with a stirrer, a condenser and a thermoregulator, were placed 1000 parts of deionized water and 30 parts of polyvinyl alcohol (average molecular weight 1500) and the mixture was, while stirring at 1000 rpm and purging with nitrogen gas, heated to 60° C. To this, were dropwise and simultaneously added a mixture of 35 parts of methyl methacrylate, 2 parts of 2-hydroxyethyl acrylate and 1 part of 2,2'-azobis-(2,4-dimethyl valeronitrile) (polymerization initiator, V-65, trademark of Wakoh Junyaku Kogyo K.K.) and a solution of 25 parts of the metal containing monomer A as used in Example 8 in 250 parts of deionized water in 1 hour. After completion of said addition, the combined mixture was heated at 70° C. and reacted for 5 hours to obtain a suspension of resinous fine particles. The suspension was then subjected to a centrifugal separation and the precipitated resinous particles were separated from the supernatant and again dispersed in deionized water. The abovesaid centrifugal separation and redispersion in deionized water operations were repeated three times to obtain acrylic resin particles (P-9) having an average primary grain diameter of 7.1μ.

Example 10

Into a 4-necked flask fitted with a reflux condenser, a stirrer, a nitrogen gas inlet tube and a dropping funnel, were placed 70 parts of xylene and 10 parts of n-butanol and the mixture was heated to 80° to 90° C. and maintained at the same temperature. To this, a mixture of 20 parts of acrylic acid, 30 parts of ethyl acrylate, 30 parts of 2-ethyl hexyl methacrylate, 20 parts of methyl methacrylate and 1.2 parts of azobisisobutyronitrile (polymerization initiator) was dropwise added at a constant speed in 3 hours and after completion of said addition, the combined mixture was maintained at the same temperature for 30 minutes. Then, a mixture of 20 parts of xylene and 0.2 parts of azobisisobutyronitrile was added in 30 minutes and the mixture was further maintained at the same temperature for additional 2 hours. to obtain a resin varnish. To this, 5 parts of emulsifier A as used in Example 8, 16 parts of 5-fluorouracil-4-carboxylic acid and 26 parts of tetraisopropoxy titanate were added and reacted at 110° C. for 4 hours. Then, thus formed precipitates were filtered, dried, pulverized and sieved to obtain resin particles (P-10) having an average grain diameter of 62μ.

Example 11

Into a similar reaction vessel as used in Example 1, were placed 1000 parts of isopropyl alcohol, 26 parts of aluminium hydroxide, 25 parts of nicotinic acid and 61 parts of methacrylic acid and the mixture was reacted at 50° C. to obtain a solution of metal containing monomer. To this, were added 30 parts of methyl methacrylate, 3 parts of azobisisobutyronitrile and 10 parts of emulsifier A as used in Example 8 and the combined mixture was subjected to polymerization at 80° C. for 4 hours. The reaction mixture was then treated as in Example 1, to obtain resin particles (P-11) having an average grain diameter of 0.2μ.

Comparative Example 1

Into a similar reaction vessel as used in Example 1, were placed 800 parts of isopropylalcohol, 50 parts of ethyleneglycol dimethacrylate and 3 parts of azobisisobutyronitrile and the mixture was polymerized as in Example 1. Thus obtained resin particles were hereinunder referred to as comparative resin particles (1).

Comparative Example 2

The same procedures as stated in Example 1 were repeated, excepting substituting 124 parts of oleic acid for 111 partrs of 2,4-dichlorophenoxy acetic acid, to obtain comparative resin particles (2).

Comparative Example 3

Into a similar reaction vessel as used in Example 1, were placed 800 parts of deionized water, 50 parts of nickel dimethacrylic acid salt and 2 parts of azobiscyanovaleric acid and the mixture was polymerized at 80° C. for 4 hours. The reaction mixture was then treated in the same way as stated in Example 1 and comparative resin particles (3) were obtained.

BIOACTIVITY TEST

Each 100 mg of the resin particles P-1 to P-11 of Examples 1 to 11 and comparative resin particles (1) to (3) of Comparative Examples 1 to 3 were placed in each 500 cc Erlenmeyer flask. To these flasks, each 1 g (wet weight) of Navicula diatom and 300 cc of filtered sea water were added and the flasks were subjected to bioactivity test under shaking at 25° C. for 7 days.

The results were evaluated by measuring the diatom's weights before and after said test. The results are shown in the following Table 1.

TABLE 1

|  | resin particles | diatom's initial weight (mg) | diatom's weight after test (mg) |
|---|---|---|---|
| Example |  |  |  |
| 1 | P-1 | 1110 |  |
| 2 | P-2 | 1120 |  |
| 3 | P-3 | 970 |  |
| 4 | P-4 | 1030 | died out |
| 5 | P-5 | 960 |  |
| 6 | P-6 | 990 |  |
| 7 | P-7 | 1050 |  |
| 8 | P-8 | 1010 |  |
| 9 | P-9 | 1110 |  |
| 10 | P-10 | 1020 |  |
| 11 | P-11 | 980 |  |
| Comp. Ex. | Comp. particles |  |  |
| 1 | (1) | 1120 | 2310 |
| 2 | (2) | 1020 | 2480 |
| 3 | (3) | 970 | 1670 |

DISINTEGRATION TEST AND TEST RESULTS

Each 1 g of the resin particles obtained in the respective Example (Examples 1 to 11 and Comparative Examples 1 to 3) were placed in a series of 500 ml Erlenmeyer flasks, to which each 200 ml of the following respective medium:

(1) tetrahydrofuran
(2) deionized water
(3) aqueous weak alkali solution (KOH solution, pH 10.2) were added and the content was stirred at 25° C. for 120 hours.

The disintegration properties were evaluated by checking the suspension conditions and determining the metal concentration of the filtrate by using an atomic absorption method. The test results are shown in Table 2.

TABLE 2

| | | Disintegration Test Results | | |
|---|---|---|---|---|
| | particles | THF (ppm) | deionized water (ppm) | aq. alkali solution (ppm) |
| Example | | | | |
| 1 | P-1 | clear (<0.1) | clear (<0.1) | milk-white (3.4) |
| 2 | P-2 | clear (<0.1) | clear (<0.1) | milk-white (2.8) |
| 3 | P-3 | clear (<0.1) | clear (<0.1) | milk-white (3.5) |
| 4 | P-4 | clear (<0.1) | clear (<0.1) | milk-white (2.1) |
| 5 | P-5 | clear (<0.1) | clear (<0.1) | milk-white (4.3) |
| 6 | P-6 | clear (<0.1) | clear (<0.1) | milk-white (2.6) |
| 7 | P-7 | clear (<0.1) | clear (<0.1) | milk-white (3.1) |
| 8 | P-8 | clear (<0.1) | clear (<0.1) | milk-white (2.1) |
| 9 | P-9 | clear (<0.1) | clear (<0.1) | milk-white (1.8) |
| 10 | P-10 | clear (<0.1) | clear (<0.1) | milk-white (2.1) |
| 11 | P-11 | clear (<0.1) | clear (<0.1) | milk-white (4.3) |
| Comp. Example | | | | |
| 1 | (1) | clear (<0.1) | clear (<0.1) | clear |
| 2 | (2) | clear (<0.1) | clear (<0.1) | milk-white (2.2) |
| 3 | (3) | clear (<0.1) | clear (<0.1) | milk-white (1.4) |

From the foregoing, it is clear that the present resin particles have the characteristic features that they are hydrolyzed and disintegrated in an aqueous weak alkali solution and at the same time, liberate a substance with a strong bioactivity toward sea-living as diatom.

REFERENCE EXAMPLE 1

Preparation of Varnish (W-1)

Into a 4-necked flask fitted with a reflux condenser, a stirrer, a nitrogen gas inlet tube and a dropping funnel, were placed 70 parts of xylene and 10 parts of n-butanol and the mixture was heated to 80° to 90° C. and maintained at the same temperature. To this, a mixture of 30 parts of 2-ethyl hexyl methacrylate, 10 parts of 2-hydroxyethyl acrylate, 30 parts of methyl methacrylate, 30 parts of ethyl acrylate and 1.2 parts of azobisisobutyronitrile (polymerization initiator) was dropwise added at a constant speed in 3 hours and after completion of said addition, the combined mixture was maintained at the same temperature for 30 minutes. Then, a mixture of 20 parts of xylene and 0.2 part of azobisisobutyronitrile was added in 30 minutes and the mixture was further maintained at the same temperature for additional 2 hours. Thus obtained varnish (W-1) had a solid content of 49.8 wt % and a viscosity of 5 poise.

REFERENCE EXAMPLE 2

Preparation of varnish (W-2)

The same procedures as stated in Reference Example 1 were repeated, excepting substituting 40 parts of dimethyl itaconate, 40 parts of ethyl acrylate and 20 parts of 2-hydroxyethyl acrylate for the polymerizable monomers of Reference Example 1, to obtain a varnish (W-2) having a solid content of 48.8 wt % and a viscosity of 6.2 poise.

Reference Example 3

Preparation of varnish (W-3)

The same procedures as stated in Reference Example 1 were repeated, excepting substituting 40 parts of methyl methacrylate and 60 parts of 2-ethyl hexyl acrylate for the polymerizable monomers of Reference Example 1, to obtain a varnish (W-3).

Examples 12 to 39 and Comparative Examples 4 to 7

Using the materials shown in Table 3 and Table 4 and subjecting to dispersion operation in high speed disper in the cases of Examples 12 to 21 and Comparative Examples 4, 6 and 7 and in ball mill for other Examples, for 30 minutes to 5 hours, coating compositions were prepared. Each composition was then applied onto a test plate in dry film thickness of about 200μ, and thus prepared test plate was attached to Discrotor, immersed in sea water (18° to 23° C.) and rotated at a constant speed (peripheral speed 35 knots) for 3 months (days and nights). The use-up rate of the coating was determined microscopically. The results are shown in Table 5.

TABLE 3

| | Examples | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| P-1 | 20 | | | | | | | | | | | |
| P-2 | | 30 | | | | | | | | | | |
| P-3 | | | 25 | | | | | | | | 30 | |
| P-4 | | | | 35 | | | | | | | | |
| P-5 | | | | | 30 | | | | | | | |
| P-6 | | | | | | 60 | | | | | | |
| P-7 | | | | | | | 40 | | | | | |
| P-8 | | | | | | | | 25 | | | | |
| P-9 | | | | | | | | | 45 | | | |
| P-10 | | | | | | | | | | | 25 | |
| P-11 | | | | | | | | | | | | 25 |
| W-1 | 80 | 70 | 75 | | | | | | | | | |
| W-2 | | | | 63 | 70 | | | | | | | |
| W-3 | | | | | | 40 | | 75 | | | 60 | 60 |
| chlorinated rubber | | | | | | | | | 35 | | | |
| Laroflex* | | | | | | | 35 | | | | | |
| Viron** | | | | | | | | | | | | |
| colloidal silica | | | | 2 | | 2 | | 2 | 2 | 2 | 2 | 2 |
| xylene | | | | | | 18 | | 15 | 20 | 10 | 10 | |
| n-butanol | | | | | | 5 | | 3 | 5 | 3 | 3 | |

TABLE 3-continued

| | Examples | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| total | 100 | 100 | 100 | 100 | 100 | 100 | 100 | 100 | 100 | 100 | 100 | 100 |

*vinyl acetate/vinyl chloride copolymer, trademark of BASF
**polyester, trademark of Toyobo K. K.

TABLE 4

| | Example | | | | | | | | | |
|---|---|---|---|---|---|---|---|---|---|---|
| | 24 | 25 | 26 | 27 | 28 | 29 | 30 | 31 | 32 | 33 |
| P-1 | 2 | | | | | | | | | 25 |
| P-2 | | 10 | | | | | | | | |
| P-3 | | | 20 | | | | | | | |
| P-4 | | | | 5 | | | | | | |
| P-5 | | | | | 15 | | | | | |
| P-6 | | | | | | 30 | | | | |
| P-7 | | | | | | | 25 | | | |
| P-8 | | | | | | | | 25 | | |
| P-9 | | | | | | | | | 30 | |
| P-10 | | | | | | | | | | |
| P-11 | | | | | | | | | | |
| Comparative particle | | | | | | | | | | |
| (1) | | | | | | | | | | |
| (2) | | | | | | | | | | |
| (3) | | | | | | | | | | |
| W-1 | | 35 | | | | | | | | |
| W-2 | 40 | | 35 | 40 | | | | | | |
| W-3 | | | | | 35 | | | | | |
| chlorinated rubber | | | | | | | | | | |
| Laroflex | | | | | | 30 | 25 | 30 | | |
| Viron | | | | | | | | | 30 | 20 |
| cuprous oxide | 20 | | | 20 | 10 | 15 | 15 | | | 15 |
| copper rhodanide | | 30 | 35 | | | | | 15 | 10 | |
| zinc white | | | | 15 | 10 | 10 | 10 | | | |
| talc | 10 | | | | 5 | | | | | |
| red oxide | 5 | | | 5 | 5 | | 5 | | | 5 |
| titanium oxide | 5 | 5 | 5 | | 10 | 5 | | 10 | | 5 |
| tetramethyl thiuram disulfide | | | | 5 | | | | 5 | 5 | |
| zinc dimethyl dithiocarbamate | | | | | | 5 | | | | 2 |
| colloidal silica | 2 | 2 | 2 | 2 | 2 | 2 | 3 | 2 | 2 | 3 |
| xylene | 10 | 10 | | 5 | 8 | | 12 | 10 | 15 | 20 |
| n-butanol | 6 | 8 | 3 | 3 | | 3 | 5 | 3 | 8 | 5 |
| total | 100 | 100 | 100 | 100 | 100 | 100 | 100 | 100 | 100 | 100 |

| | Example | | | | | | Comp. Example. | | | |
|---|---|---|---|---|---|---|---|---|---|---|
| | 34 | 35 | 36 | 37 | 38 | 39 | 4 | 5 | 6 | 7 |
| P-1 | 40 | | | | | | | | | |
| P-2 | | | | | | | | | | |
| P-3 | | | 40 | | | | | | | |
| P-4 | | | | | | | | | | |
| P-5 | | 40 | | | | | | | | |
| P-6 | | | | | | | | | | |
| P-7 | | | | | | | | | | |
| P-8 | | | | 10 | | | | | | |
| P-9 | | | | | | | | | | |
| P-10 | | | | | 15 | | | | | |
| P-11 | | | | | | 15 | | | | |
| Comparative particle | | | | | | | | | | |
| (1) | | | | | | | 30 | 15 | | |
| (2) | | | | | | | | | 30 | 15 |
| (3) | | | | | | | | | | |
| W-1 | | | | 40 | 40 | | | | | 85 |
| W-2 | | | | | | | | | | |
| W-3 | | | 35 | | | | | 70 | | |
| chlorinated rubber | 35 | | | | | | 68 | | | |
| Laroflex | | | | 40 | | | | | | |
| Viron | | 35 | | | | | | 40 | | |
| cuprous oxide | | | | 15 | | | | 10 | | |
| copper rhodanide | | 5 | 15 | | 15 | 15 | | 10 | | |
| zinc white | | | | | | | | | | |
| talc | | | | | 5 | 5 | | | | |
| red oxide | | | | 5 | | | | | | |
| titanium oxide | | | | | 5 | 5 | | 5 | | |
| tetramethyl thiuram disulfide | 5 | | 5 | | | | | | | |
| zinc dimethyl dithiocarbamate | | | | | | | | | | |

TABLE 4-continued

| | | | | | | | | | |
|---|---|---|---|---|---|---|---|---|---|
| colloidal silica | 2 | 2 | 2 | 2 | 2 | 2 | 2 | 2 | |
| xylene | 15 | 15 | 3 | 25 | 15 | 15 | | 15 | |
| n-butanol | 3 | 3 | | 3 | 3 | 3 | | 3 | |
| n-butanol | 3 | 3 | | 3 | 3 | 3 | | 3 | |
| total | 100 | 100 | 100 | 100 | | 100 | 100 | 100 | 100 |

TABLE 5

Coating use-up rate

| | initial film thickness ($\mu$) A | film thickness after 3 months ($\mu$) B | use-up rate A−B |
|---|---|---|---|
| Example | | | |
| 12 | 85 | 75 | 10 |
| 13 | 95 | 80 | 15 |
| 14 | 120 | 110 | 10 |
| 15 | 100 | 85 | 15 |
| 16 | 95 | 80 | 15 |
| 17 | 110 | 90 | 20 |
| 18 | 105 | 95 | 10 |
| 19 | 100 | 95 | 5 |
| 20 | 85 | 70 | 15 |
| 21 | 80 | 60 | 20 |
| 22 | 200 | 195 | 5 |
| 23 | 180 | 165 | 15 |
| 24 | 210 | 200 | 10 |
| 25 | 190 | 170 | 20 |
| 26 | 200 | 175 | 25 |
| 27 | 185 | 170 | 15 |
| 28 | 220 | 195 | 25 |
| 29 | 210 | 175 | 35 |
| 30 | 210 | 180 | 30 |
| 31 | 195 | 160 | 35 |
| 32 | 170 | 150 | 20 |
| 33 | 180 | 150 | 30 |
| 34 | 220 | 190 | 30 |
| 35 | 175 | 140 | 35 |
| 36 | 185 | 140 | 45 |
| 37 | 210 | 195 | 15 |
| 38 | 195 | 185 | 10 |
| 39 | 205 | 180 | 25 |
| Comp. Ex. | | | |
| 4 | 95 | 95 | 0 |
| 5 | 185 | 185 | 0 |
| 6 | 170 | 120 | 50 |
| 7 | 160 | 125 | 35 |

Next, the respective coating composition was applied twice by brushing onto a sand-blasted steel plate previously coated with an anti-corrosive paint, so as to give a coating of 100$\mu$ dry thickness each time. Thus prepared test plate was immersed in sea water for a defined period of time and the antifouling effect was examined. This test was conducted at Aioi Bay, Hyogo Pref. Japan. The results are shown in Table 6.

TABLE 6

(Antifouling test)
(surface area % adhered with submarine livings)

| | duration of immersion (months) | | | | | | |
|---|---|---|---|---|---|---|---|
| | 3 | 6 | 9 | 12 | 18 | 24 | 30 |
| Example | | | | | | | |
| 12 | 0 | 0 | 0 | 0 | 0 | 0 | 0 |
| 13 | 0 | 0 | 0 | 0 | 0 | 0 | 0 |
| 14 | 0 | 0 | 0 | 0 | 0 | 0 | 0 |
| 15 | 0 | 0 | 0 | 0 | 0 | 0 | 0 |
| 16 | 0 | 0 | 0 | 0 | 0 | 0 | 0 |
| 17 | 0 | 0 | 0 | 0 | 0 | 0 | 0 |
| 18 | 0 | 0 | 0 | 0 | 0 | 0 | 0 |
| 19 | 0 | 0 | 0 | 0 | 0 | 0 | 0 |
| 20 | 0 | 0 | 0 | 0 | 0 | 0 | 0 |
| 21 | 0 | 0 | 0 | 0 | 0 | 0 | 0 |
| 22 | 0 | 0 | 0 | 0 | 0 | 10 | 30 |
| 23 | 0 | 0 | 0 | 0 | 0 | 0 | 0 |
| 24 | 0 | 0 | 0 | 0 | 0 | 0 | 0 |
| 25 | 0 | 0 | 0 | 0 | 0 | 0 | 0 |
| 26 | 0 | 0 | 0 | 0 | 0 | 0 | 0 |
| 27 | 0 | 0 | 0 | 0 | 0 | 0 | 0 |
| 28 | 0 | 0 | 0 | 0 | 0 | 0 | 0 |
| 29 | 0 | 0 | 0 | 0 | 0 | 0 | 0 |
| 30 | 0 | 0 | 0 | 0 | 0 | 0 | 0 |
| 31 | 0 | 0 | 0 | 0 | 0 | 0 | 0 |
| 32 | 0 | 0 | 0 | 0 | 0 | 0 | 0 |
| 33 | 0 | 0 | 0 | 0 | 0 | 0 | 0 |
| 34 | 0 | 0 | 0 | 0 | 0 | 0 | 0 |
| 35 | 0 | 0 | 0 | 0 | 0 | 0 | 0 |
| 36 | 0 | 0 | 0 | 0 | 0 | 0 | 0 |
| 37 | 0 | 0 | 0 | 0 | 0 | 0 | 0 |
| 38 | 0 | 0 | 0 | 0 | 0 | 0 | 10 |
| 39 | 0 | 0 | 0 | 0 | 0 | 0 | 0 |
| Comp. Ex. | | | | | | | |
| 4 | 10 | 100 | 100 | 100 | discontinued (because of thorough dissolution of the coating) | | |
| 5 | 0 | 30 | 100 | 100 | | | |
| 6 | 50 | 100 | 100 | 100 | | | |
| 7 | 10 | 70 | 100 | 100 | | | |

What is claimed is:

1. Disintegration type spherical form crosslinked resin particles having an average grain diameter of 0.01 to 250$\mu$, at least one crosslinking structure of said crosslinked resin carrying a metal ester bond of the formula:

$$-X-O)_mM(-R_1)_n$$

wherein X represents

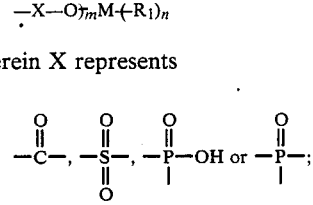

$R_1$ is a monovalent, bioactive organic acid residue; M stands for a polyvalent metal having a valence of 3 or more; m is an integer of 2 or more; n is an integer of 1 or more, providing that the sum of m and n is equal to the valence of said metal M wherein the amount of crosslinking structure carrying metal ester bond in the respective particles, when expressed in terms of crosslinking density=number of moles of organic acid involved in said crosslinking structure/total weight (g) of crosslinked resin particles, is 0.00003 to 0.01 mole/g.

2. Particles according to claim 1, wherein the polyvalent metal M is selected from the group consisting of IIIa, IVa, IVb, Vb and VIb metals of the Periodic Table and Fe.

3. A coating composition comprising disintegration type spherical form crosslinked resin particles uniformly dispersed in a film-forming resin varnish, said particles having an average grain diameter of 0.01 to 250$\mu$, at least one crosslinking structure carrying a metal ester bond of the formula:

$$-X-O)_mM-R_1)_n$$

wherein X represents

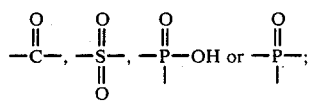

$R_1$ is a monovalent, bioactive organic acid residue; M stands for a polyvalent metal having a valence of 3 or more; m is an integer of 2 or more; n is an integer of 1 or more, providing that the sum of m and n is equal to the valence of said metal M, wherein the solid weight ratio of said film-forming resin to said particle resin is 99/1 to 30/70, and wherein the amount of crosslinking structure carrying metal ester bond in the respective particles, when expressed in terms of crosslinking density=number of moles of organic acid involved in said crosslinking structure/total weight (g) of crosslinked resin particles, is 0.00003 to 0.01 mole/g.

4. A composition according to claim 3, wherein the polyvalent metal M is selected from the group consisting of IIIa, IVa, IVb, Vb and VIb metals of the Periodic Table and Fe.

5. A composition according to claim 3, which further contains an antifouling agent.

6. A composition according to claim 3, wherein the resin particles are uniformly dispersed in a film-forming resin varnish by using an ampho-ionic group-containing resin oligomer.

* * * * *